United States Patent [19]

Seidel et al.

[11] Patent Number: 5,412,206

[45] Date of Patent: May 2, 1995

[54] METHOD AND APPARATUS FOR DETERMINING THE DEPTH OF A GAMMA EMITTING ELEMENT BENEATH THE SURFACE

[75] Inventors: John G. Seidel, McCandless; Frank H. Ruddy, Monroeville; Joseph L. Gonzalez, White Oak Boro; Thomas V. Congedo, Pittsburgh, all of Pa.

[73] Assignee: Westinghouse Electric Company, Pittsburgh, Pa.

[21] Appl. No.: 199,362

[22] Filed: Feb. 18, 1994

[51] Int. Cl.$^6$ .................... G01T 1/169; G01V 5/00
[52] U.S. Cl. .................... 250/253; 250/394; 250/395
[58] Field of Search .................... 250/394, 395, 253

[56] References Cited

U.S. PATENT DOCUMENTS

| | | | |
|---|---|---|---|
| 2,395,322 | 2/1946 | Evans | 97/47 |
| 2,557,158 | 6/1951 | Teichmann | 250/83.6 |
| 2,562,914 | 8/1951 | Herzog | 250/83.6 |
| 2,781,453 | 2/1957 | Belcher et al. | 250/83.6 |
| 2,800,857 | 7/1957 | Bennett | 97/46.39 |
| 3,008,046 | 11/1961 | Carpenter | 250/71.5 |
| 3,124,684 | 3/1964 | Eberline | 250/71.5 |
| 3,341,706 | 9/1967 | Swift et al. | 250/83.3 |
| 3,354,310 | 11/1967 | Swift | 250/83.3 |
| 3,433,310 | 3/1969 | Harper | 172/171 |
| 3,444,721 | 5/1969 | Hearn et al. | 73/23 |
| 3,463,922 | 8/1969 | Senftle et al. | 250/253 X |
| 3,483,371 | 12/1969 | Canup et al. | 250/253 |
| 3,508,046 | 4/1970 | Anton et al. | 250/394 |
| 3,715,758 | 2/1973 | Sender | 343/112 R |
| 3,723,727 | 3/1973 | Wogman et al. | 250/83.3 |
| 3,781,556 | 12/1973 | Taylor et al. | |
| 3,801,816 | 4/1974 | Arnold | 250/270 |
| 3,832,545 | 8/1974 | Bartko | 250/312 |
| 3,889,112 | 6/1975 | Holmes et al. | 250/265 |
| 3,918,056 | 11/1975 | Merrick | 343/6.5 LC |
| 3,938,146 | 2/1976 | Dano | 343/6.5 LC |
| 4,056,969 | 11/1977 | Barringer | 73/28 |
| 4,146,796 | 3/1979 | Campbell | 250/253 |
| 4,232,220 | 11/1980 | Hertzog | 250/270 |
| 4,232,317 | 11/1980 | Freeny, Jr. | 343/112 R |
| 4,248,310 | 2/1981 | McWilliams | 172/661 |
| 4,278,885 | 7/1981 | von Alfthan | 250/370 |
| 4,302,285 | 11/1981 | Pronman et al. | 376/159 |
| 4,314,155 | 2/1982 | Sowerby | 250/253 |
| 4,317,033 | 2/1982 | Panenka et al. | 250/253 |
| 4,350,887 | 9/1982 | Barnard et al. | 250/265 |
| 4,421,981 | 12/1983 | Hough | 250/253 |
| 4,464,330 | 8/1984 | Speir et al. | 376/159 |
| 4,483,817 | 11/1984 | Evans et al. | 376/159 |
| 4,581,531 | 4/1986 | Dion | 250/253 |
| 4,645,926 | 2/1987 | Randall | 250/256 |
| 4,749,858 | 6/1988 | Young | 250/253 |
| 4,754,136 | 6/1988 | Blakely | 250/301 |
| 4,825,073 | 4/1989 | Smith, Jr. et al. | 250/260 |
| 5,025,150 | 6/1991 | Oldham et al. | 250/253 |
| 5,038,042 | 8/1991 | Hansen et al. | 250/368 |
| 5,133,901 | 7/1992 | Peterson et al. | 252/626 |
| 5,286,973 | 2/1994 | Westrom et al. | 250/253 |

FOREIGN PATENT DOCUMENTS

| | | |
|---|---|---|
| 0081075 | 6/1983 | European Pat. Off. |
| 2148490 | 5/1985 | United Kingdom ............... 250/394 |

OTHER PUBLICATIONS

B. D. Sowerby, "On-Line and Bulk Analysis of Coal . . .", Journal of Radioanalytical and Nuclear Chemistry, Articles, vol. 123, Feb. 8, 1988, pp. 61-75.

(List continued on next page.)

*Primary Examiner*—Constantine Hannaher
*Assistant Examiner*—Edward J. Glick

[57] ABSTRACT

A method for determining the depth of a gamma emitting element beneath the surface of a volume of soil is disclosed. The disclosed method includes the steps of detecting gamma rays at a first height $h_1$ above the surface; detecting gamma rays at a second height $h_2$ above the surface; determining a ratio R representative of the ratio of the number of gamma rays detected at $h_2$ to the number of gamma rays detected at $h_1$, or vice versa; and inferring, on the basis of the ratio R, an estimate of the depth of the gamma emitting element beneath the surface.

15 Claims, 4 Drawing Sheets

OTHER PUBLICATIONS

H. R. Meyer et al., "Field Instruments Developed For Radiation Measurements on the UMTRA Project," Publ. in Proceedings, Waste Management, Mar. 1987, U. of Arizona, 5 pages.

G. M. Worth et al., "Use of Commercial Ranging System in Field Surveys of Radioactively Contaminated Sites," 1984 IEEE Nuclear Science Symposium, Oct. 31–Nov. 2, 1984, 5 pages.

D. H. Jensen et al., "Status of a Pulsed-Neutron Logging Probe Using a High-Purity Germanium Detector," IEEE Transactions on Nuclear Science, vol. NS-30, No. 2, Apr. 1983, pp. 1657–1662.

L. Evans, "In Situ Elemental analysis Using Neutron-Capture Gamma-Ray Spectroscopy," Nuclear Instruments and Methods, (North-Holland, 1982), pp. 353–357.

L. Evans, "Determination of Elemental Composition in Geochemical Exploration Using A 14-MeV Neutron Generator" IEEE Transactionson Nuclear Science, I. Experimental Aspects, vol. NS-28, No. 2, Apr. 1981, pp 1626–1628.

J. Lapides, "Determination of Elemental Composition in Geochemical Exploration Using A 14-MeV Neutron Generator" II. Theoretical Aspects, IEEE Transactioins on Nuclear Science, vol. NS-28, No. 2, Apr. 1981, pp. 1629–1631.

J. McKlveen, "A Compilation of Fast Neutron Interactions, Cross Sections, Gamma Spectra and Gamma Decay Energies" IEEE Transactions on Nuclear Science, vol. NS-28, No. 2, Apr. 1981, pp. 1632–1634.

C. Herzenberg, "Use of Small Accelerators in Coal Analysis and Coal Slurry Flow Measurements," IEEE Transactions on Nuclear Science, vol. NS-26, No. 1 Part 2 of 2 Parts, Feb. 1979, pp. 1568–1573.

Neutron Sources and Publications, Proceedings of the American Nuclear Scoiety National Topical Meeting, 1971, Conf-170402, vol. III, "A Prompt Gamma-Ray Coal Analysis System," IV-40 to IV-46.

L. Evans, "Inter-Pulse High—Resolution Gamma-Ray Spectra Using A 14 MeV Pulsed Neutron Generator," Nuclear Instruments and Methods in Physics Research 219 (1984), pp. 233–242.

W. E. Clem et al., "Mobile Surface Contamination Monitor For Large Area Radiological Surveillance," Rockwell Handford Operation, Richland, Washington, Abstract, pp. 1–4.

Jensen et al., "Pulsed Neutron Gamma Ray Logging For Minerals Associated with Uranium", IEEE Transactions on Nuclear Science, vol. NS-28, No. 2, Apr. 1981, pp. 1685–1690.

METHOD AND APPARATUS FOR DETERMINING THE DEPTH OF A GAMMA EMITTING ELEMENT BENEATH THE SURFACE

BACKGROUND OF THE INVENTION

The present invention relates generally to methods and apparatus for use in soil remediation, and more particularly to methods and apparatus for determining the depth of a gamma emitting element beneath the surface of a volume of material.

With the growing awareness of contamination of large tracts of land with chemically or radioactively hazardous elements, there is a corresponding international effort to initiate remediation activities to restore affected regions to an environmental status considered acceptable. To this end, soil washing and other methods are being developed. For these methods to be technically efficient and cost effective, it is necessary to accurately identify where the contamination in a field is located.

U.S. patent application Ser. No. 958,215, filed Oct. 8, 1992, titled "Prompt Gamma Neutron Activation Analysis System," which is hereby incorporated by reference, discloses the use of Prompt Gamma Neutron Activation Analysis (PGNAA) in soil remediation. Experimental and analytical data presented therein demonstrate that the disclosed methods and system are capable of measurements of trace element concentrations within a material sample by achieving extremely high signal-to-noise ratios.

PGNAA employs neutron-induced reactions. Such reactions can be divided into two broad categories—threshold reactions and exoergic reactions. For threshold reactions, energy in the form of neutron kinetic energy is required to supply a certain minimum energy to the reaction system before the reaction can proceed. Neutrons with energies below this minimum threshold energy are incapable of inducing the nuclear reaction. For exoergic reactions, the threshold is zero; that is, neutrons with all energies are capable of inducing the reaction.

FIG. 1 illustrates the process of neutron activation at a nuclear level. A neutron of energy E from a source 16 collides with the nucleus of an atom in the sample and initiates a reaction. For a neutron of thermal energy (0.0252 eV), the reaction might be absorption of the neutron into the nucleus, creating the next higher mass isotope of that element. If the neutron is more energetic (e.g., with several mega-electronvolts of kinetic energy), other nuclear reactions are possible. These other reactions include reactions wherein nuclear transmutation to another element occurs. In each of these cases, the residual nucleus is left in a highly excited internal state, and decays to its ground state almost instantaneously, emitting a gamma ray of several mega-electronvolts of energy. The energy of this gamma ray is uniquely characteristic of the quantum structure of the residual nucleus, and thus is a signature of the original target nucleus. The number of atoms of each of the elements of interest in a sample can be estimated by detecting (with a detector 12) and collecting the spectrum of gamma rays emitted by the sample and integrating the appropriate peaks.

Three methods for inferring the depth distribution of a contaminant element in a field of soil or other matrix material are disclosed by the above-cited U.S. patent application Ser. No. 958,215. These methods are summarized below:

1. The first method uses the inherent sensitivity bias of fast neutron-induced nuclear reactions for interrogating shallow depths (several inches) versus the deeper interrogation which is characteristic of thermal neutron-induced nuclear reactions.

2. The second method is based on the fact that, if a neutron-induced reaction on a particular nuclide of a contaminant element gives rise to more than one gamma ray, each with a known branching ratio, and if the energies of two or more such gamma rays are significantly different, the different amounts by which the gamma rays attenuate in propagating through the soil back to a detector will alter the ratio of their detected signals by an amount which is a unique signature of the average depth of the contaminant aggregate.

3. The third method makes use of the successive placement of none, one, or more reflectors above the neutron tube. The reflectors are large masses of highly moderating (low atomic mass constituent) materials. Graphite and polyethylene are examples. Such materials have the effect of utilizing neutrons which otherwise would have travelled upward from the neutron tube, significantly lowering their energy by collisions with the nuclei of the atomic constituents and reflecting them back toward the ground. The result is that the thermal neutron flux can be tailored to be highest in the shallow (several inches) depths of the soil with the reflectors, versus peaking at 6 to 10 inches (15.2 to 25.4 cm) below the soil surface in the absence of a reflector. Thus, even using only thermal neutron-induced nuclear reactions, it becomes possible to infer a depth distribution of a contaminant using thermal neutron PGNAA.

SUMMARY OF THE INVENTION

The present invention provides a fourth novel method for inferring the average depth of a contaminant using nuclear counting. The invention is applicable for detecting PGNAA induced gamma rays and naturally emitted gamma rays. The invention takes advantage of the fact that the number of gamma ray signals detected from a finite-size source in a fixed counting time interval decreases in a predictable fashion as the distance between the source and detector is varied.

According to the present invention, a method for determining the depth of a gamma emitting element beneath the surface of a volume of material comprises the steps of detecting gamma rays at a first height $h_1$ above the surface; detecting gamma rays at a second height $h_2$ above the surface; determining a ratio R representative of the ratio of the number of gamma rays detected at $h_2$ to the number of gamma rays detected at $h_1$, or vice versa; and inferring, on the basis of the ratio R, an estimate of the depth of the gamma emitting element beneath the surface.

In one presently preferred embodiment of the invention, the method further comprises the step of effecting the emission of gamma rays by the gamma emitting element by irradiating the volume of material with neutrons.

In addition, in the presently preferred embodiment the ratio is given by $R = (x+h_2)^2/(x+h_1)^2$, wherein "x" represents the depth of the gamma emitting element. The depth estimation may be carried out by predetermining a plot of R versus x by implanting gamma emitting sources at known depths and measuring corresponding values of R, and then comparing the ratio R measured for a source at an unknown depth with the plot to infer the estimate of the depth of the gamma emitting element.

The present invention also provides a system including means for carrying out the method summarized above. One exemplary embodiment of such a system comprises a gamma detector; a vehicle that is movable over the surface, the vehicle carrying the gamma detector and including means for moving the gamma detector vertically in relation to the surface; and a computer and associated support electronics for determining a ratio R of a number of gamma rays detected at a height $h_2$ to a number of gamma rays detected at another $h_1$, or vice versa, and for deducing, on the basis of the ratio R, an estimate of the depth of the gamma emitting element beneath the surface. The system may advantageously include a neutron source, attached to the vehicle, for effecting the emission of gamma rays by the gamma emitting element.

Other features of the invention are described below.

BRIEF DESCRIPTION OF THE DRAWINGS

FIG. 4 depicts only the solid angle factor effect on the ratio R.

DETAILED DESCRIPTION OF PREFERRED EMBODIMENTS

Figure 2:
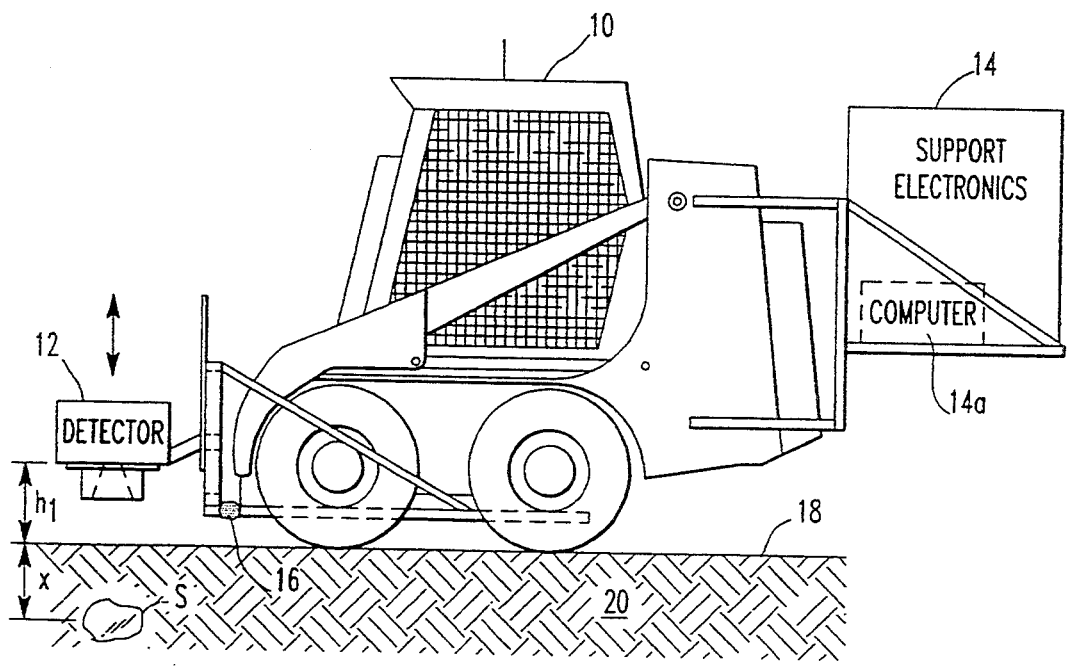
FIG. 2 is a schematic diagram of one embodiment of a system for determining the depth of a gamma emitting element in accordance with the present invention.

FIG. 2 schematically depicts one exemplary embodiment of a system for determining the depth of a gamma emitting element beneath the surface of a soil in accordance with the present invention. The system comprises a vehicle 10; gamma detector 12; support electronics 14, including a computer 14a; and an optional neutron source 16 for PGNAA applications The gamma emitting element, denoted "S", is shown at a depth "x" beneath the surface 18 of a soil (or other matrix material) volume 20. The gamma detector 12 is shown at a height "$h_1$" above the surface. The vertical double arrow above the gamma detector 12 indicates that the vehicle 10 is capable of moving the gamma detector to different heights in carrying out the inventive method described herein. The individual components depicted, including the vehicle 10, gamma detector 12, support electronics 14, and neutron source 16, are of common construction and, therefore, are not described in detail in this specification. If necessary, the reader may refer to the above-cited U.S. patent application for further information about gamma ray detection and PGNAA.

In presently preferred embodiments of the invention, measurements are made in several steps, with the gamma detector fixed at different heights above the surface. The present inventors have discovered that the average depth of the aggregate of gamma-emitting material can be deduced from the ratio of detected gamma intensity at different detector elevations above ground. It can also be demonstrated that, for localized sources, the intensity ratio versus depth relationship is independent of the energy of the detected photons or the matrix material composition.

The present invention is based on the phenomena experienced by a stream of gamma rays of energy E emitted isotropically by a gamma source S at a depth x beneath the surface of soil or some other matrix material (e.g., concrete, water, or other material). The source S could contain a naturally radioactive isotope or could be emitting prompt gamma rays as a result of PGNAA interrogation (e.g., by the neutron source 16 of the FIG. 2 embodiment).

First, assume that S is a point source, which is the simplest case. For an emission rate of N gammas per second of energy E from source S, the intensity of these gamma rays arriving at a narrow detector, located at an elevation h above the surface, is given by:

$$\phi = N(e^{-\mu x}/4\pi(x+h)^2),$$

where $\mu$ is the linear attenuation coefficient (with units of inverse length) of the matrix material for photons of energy E.

The exponential in the numerator of the above expression corresponds to the attenuation of the gamma ray intensity as a result of travelling through a distance x of the matrix material, and the denominator ($4\pi(x+h)^2$) corresponds to the inverse square falloff with distance of the intensity emitted from a point source. (This inverse square falloff is discussed below with reference to FIG. 4.) From this expression, one can see that, if a measurement of the rate of gamma detection is made with the gamma detector 12 placed at each of two detector heights, $h_1$ and $h_2$, the ratio $R = \phi(h_1)/100 (h_2)$ of these rates will be given by:

$$R = (x+h_2)^2/(x+h_1)^2$$

This result for a point source depends only on the detector heights $h_1$ and $h_2$ and the source depth x below ground. For the special case of the source S at the surface, $x = 0$ and the ratio is given by the square of the ratio of the detector heights. Conversely, if the ratio is measured for known heights $h_1$ and $h_2$, the depth x can be inferred. In measurements made using two different detector heights, the gamma rays from a localized source reaching the detector 12 have penetrated the same depth x of the matrix material. Therefore, the exponential term cancels when the ratio is formed. In this case, the inventive method is independent of the matrix material and the energy of the gamma ray.

Figure 3:
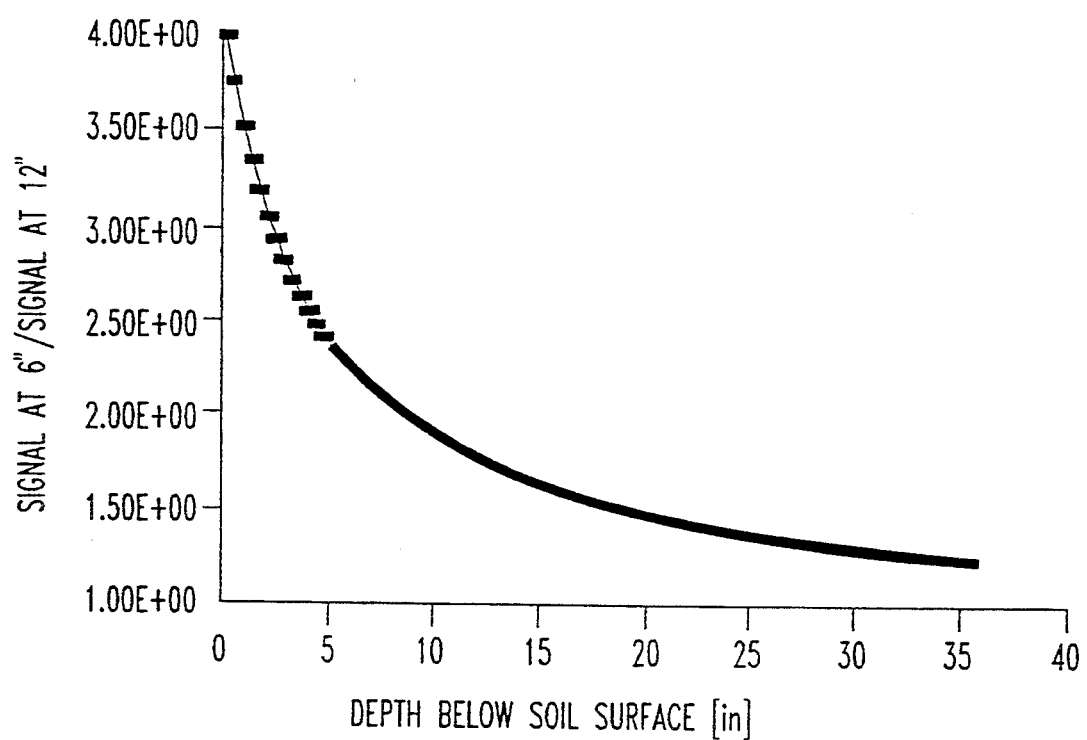
FIG. 3 is a plot of the ratio of detected signals at 6 and 12 inch (0.15 and 0.30 meter) detector heights as a function of source depth. This plot indicates that the signal ratio is a unique function of source depth and is independent of photon energy.

As an example, FIG. 3 presents the expected ratio R for $h_1 = 6$ inches (15.2 cm) and $h_2 = 12$ inches (30.5 cm), as a function of the depth x of a point source located beneath the surface. The expected ratio is shown for gamma ray energies of 4 MeV and 1 MeV. The ratio is a unique function of x and is independent of the attenuation coefficient $\mu$. This is indicated by the two sets of predictions for different gamma ray energies. The behavior for a source at the surface is supported by the following data, taken in a series of five minute counting intervals in the inventors' laboratory:

TABLE 1

Measured count rates and their ratios, from a series of five minute counting intervals, using a small $^{60}$Co source, placed at detector heights of six inches and twelve inches. Ratios include minimum standard deviations. These data support the inverse square variation of intensity from a narrow source with distance to the detector.

| $^{60}$Co Gamma Energy | Measured Count Rate (cpm) for $h_1 = 6$ inches | Measured Count Rate (cpm) for $h_2 = 12$ inches | Measured Ratio $R = CR(h_1)/CR(h_2)$ (with Std Dev) |
|---|---|---|---|
| 1173 keV | 1868 | 459 | 4.07 ($\pm$ 0.09) |
| 1332 keV | 1654 | 424 | 3.90 ($\pm$ 0.09) |

Figure 4:
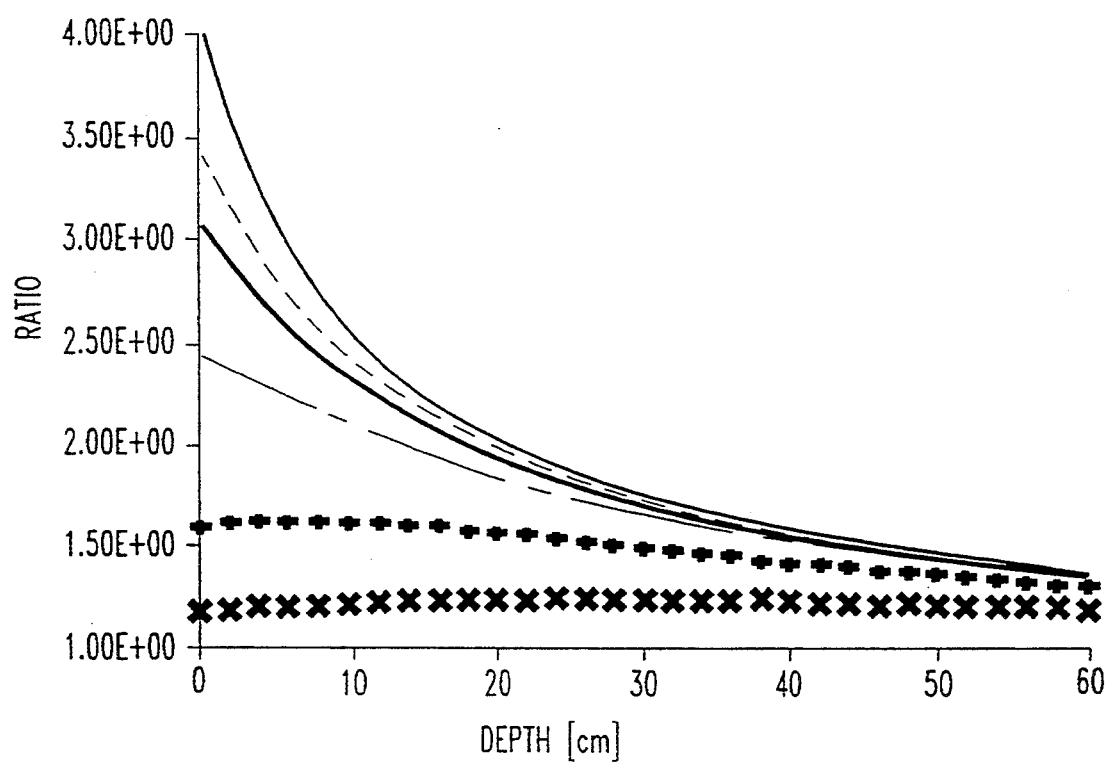
FIG. 4 is a plot of expected view ratio R as a function of the depth x of a source beneath the surface. The view ratio is plotted for detector heights $h_1 = 6$ inches (0.15 meter) and $h_2 = 12$ (0.30 meter) and for several different source diameters.

As the lateral dimensions of a below ground gamma source increase, a lower order dependence on depth follows, as indicated in FIG. 4. FIG. 4 depicts only the solid angle factor (geometric efficiency) effect on the ratio R, for a three-inch diameter detector held at heights of six inches (15.2 cm) and twelve inches (30.5 cm) above the surface. The inverse square dependence characteristic of a point source is also plotted for comparison. In addition, for an extended source, gamma rays from the outer regions will travel different depths in the absorbing medium, for the cases of different detector heights. This will introduce a weak dependence on photon energy and matrix material, and can be accounted for analytically. This is explained below with reference to FIG. 5. In field applications, the measurement of the lateral falloff of count rate with position can indicate which approximate source width should be used for depth inference.

Figure 1:
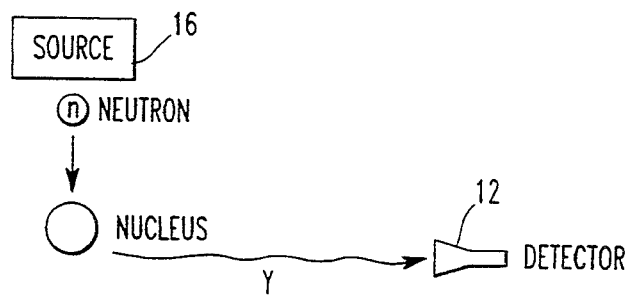
FIG. 1 is a schematic diagram of a basic PGNAA system as known from the prior art.
Figure 5:
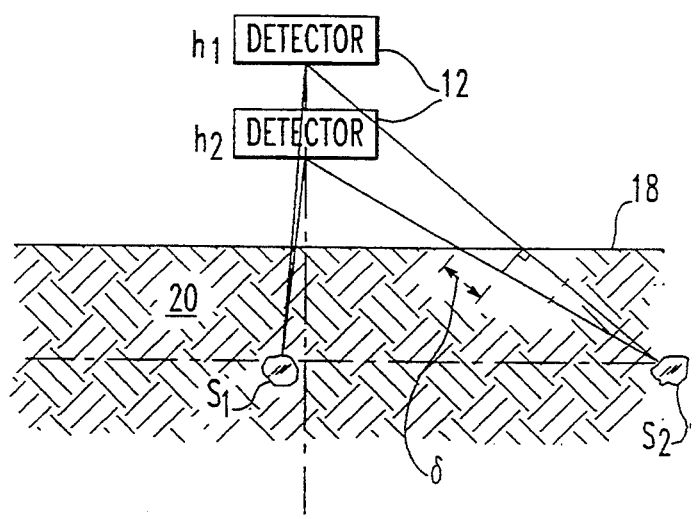
FIG. 5 illustrates the origin of a mild energy dependence in the ratio of yields measured when the detector is placed at different heights above the ground.

As mentioned above, a weak energy dependence emerges in the ratio of yields measured when the detector 12 (FIG. 1) is placed at different heights above the ground (or surface of some other matrix material). This is a consequence of the fact that, for a source region which is below the soil surface and of finite width (i.e., of finite dimensions parallel to the surface), the gamma rays from the source perimeter region reaching the detector have travelled through differing depths of soil, in the cases of the detector placed at two different elevations above the ground. This is illustrated in FIG. 5, which depicts how a first source region "$S_1$" close to a vertical line connecting the two detector positions $h_1$, $h_2$ produces gamma rays that travel substantially the same distance through the soil 20 toward the two detector positions, whereas a second source region "$S_2$" far from the vertical line produces gamma rays that travel distances through the soil that differ by an amount "$\delta$". Moreover, it is apparent that this effect is more severe for gamma sources nearer the surface 18. This effect may be readily modelled in commercially available transport codes that treat the gamma transport problem. The DOT and MCNP codes are two commercially available, internationally recognized examples of such code.

As mentioned, the present invention is not limited to methods and apparatus employing PGNAA, since it can be employed in connection with naturally radioactive sources. In addition, it is apparent that the invention may be employed in determining the depth of a radioactive source implanted in a volume of material other than soil, wherein the detector is placed above, below, or on a side of the volume, as the reference frame of the disclosed system may be rotated in accordance with known techniques. Accordingly, except where they are expressly so limited, the scope of protection of the following claims is not limited to the details specified above.

We claim:

1. A method for determining the depth of a gamma emitting element beneath the surface of a volume of material, comprising the steps of:
    (a) detecting gamma rays at a first height $h_1$ above the surface;
    (b) detecting gamma rays at a second height $h_2$ above the surface;
    (c) determining a ratio R representative of the ratio of the number of gamma rays detected at $h_2$ to the number of gamma rays detected at $h_1$, or vice versa; and
    (d) inferring, on the basis of the ratio R, an estimate of the depth of the gamma emitting element beneath the surface.

2. A method as recited in claim 1, further comprising, prior to step (a), the step of effecting the emission of gamma rays by said gamma emitting element by irradiating said volume with neutrons.

3. A method as recited in claim 1, wherein said ratio is given by $$R = (x+h_2)^2/(x+h_1)^2,$$

wherein x represents the depth of the gamma emitting element.

4. A method as recited in claim 3, further comprising the steps of predetermining a plot of R versus x by implanting gamma emitting sources at known depths and measuring corresponding values of R, and then comparing the ratio R measured for a source at an unknown depth with said plot to infer said estimate of the depth of the gamma emitting element.

5. A method as recited in claim 4, further comprising the step of effecting the emission of gamma rays by said gamma emitting element by irradiating said volume with neutrons.

6. A system for determining the depth of a gamma emitting element beneath the surface of a volume of material, comprising:
    (a) detecting means for detecting gamma rays at a first height $h_1$ and a second height $h_2$ above the surface;
    (b) means coupled to said detecting means for determining a ratio R representative of the ratio of the number of gamma rays detected at $h_2$ to the number of gamma rays detected at $h_1$, or vice versa; and
    (c) means for inferring, on the basis of the ratio R, an estimate of the depth of the gamma emitting element beneath the surface.

7. A system as recited in claim 6, further comprising means for effecting the emission of gamma rays by said gamma emitting element by irradiating said volume with neutrons.

8. A system as recited in claim 6, wherein said ratio is given by $$R = (x+h_2)^2/(x+h_1)^2,$$

wherein x represents the depth of the gamma emitting element.

9. A system as recited in claim 8, further comprising means for predetermining a plot of R versus x by implanting gamma emitting sources at known depths and measuring corresponding values of R, and then comparing the ratio R measured for a source at an unknown depth with said plot to infer said estimate of the depth of the gamma emitting element.

10. A system as recited in claim 9, further comprising means for effecting the emission of gamma rays by said gamma emitting element by irradiating said volume with neutrons.

11. A system for determining the depth of a gamma emitting element beneath the surface of a volume of material, comprising:

(a) a gamma detector;

(b) a vehicle that is movable over said surface, said vehicle carrying said gamma detector and including means for moving said gamma detector vertically in relation to said surface; and (c) a computer and associated support electronics for determining a ratio R of a number of gamma rays detected at a height $h_2$ to a number of gamma rays detected at another $h_1$, or vice versa, and for deducing, on the basis of the ratio R, an estimate of the depth of the gamma emitting element beneath the surface.

12. A system as recited in claim 11, further comprising a neutron source, attached to said vehicle, for effecting the emission of gamma rays by said gamma emitting element.

13. A system as recited in claim 11, wherein said ratio is given by $$R=(x+h_2)^2/(x+h_1)^2,$$

wherein x represents the depth of the gamma emitting element.

14. A system as recited in claim 13, further comprising means for predetermining a plot of R versus x, and then comparing the ratio R measured for a source at an unknown depth with said plot to infer said estimate of the depth of the gamma emitting element.

15. A system as recited in claim 14, further comprising a neutron source, attached to said vehicle, for effecting the emission of gamma rays by said gamma emitting element.

* * * * *